Nov. 24, 1964 R. L. BALKE 3,157,939
METHOD OF INSULATING AND RETAINING CONDUCTORS IN SLOTS
Filed April 6, 1961
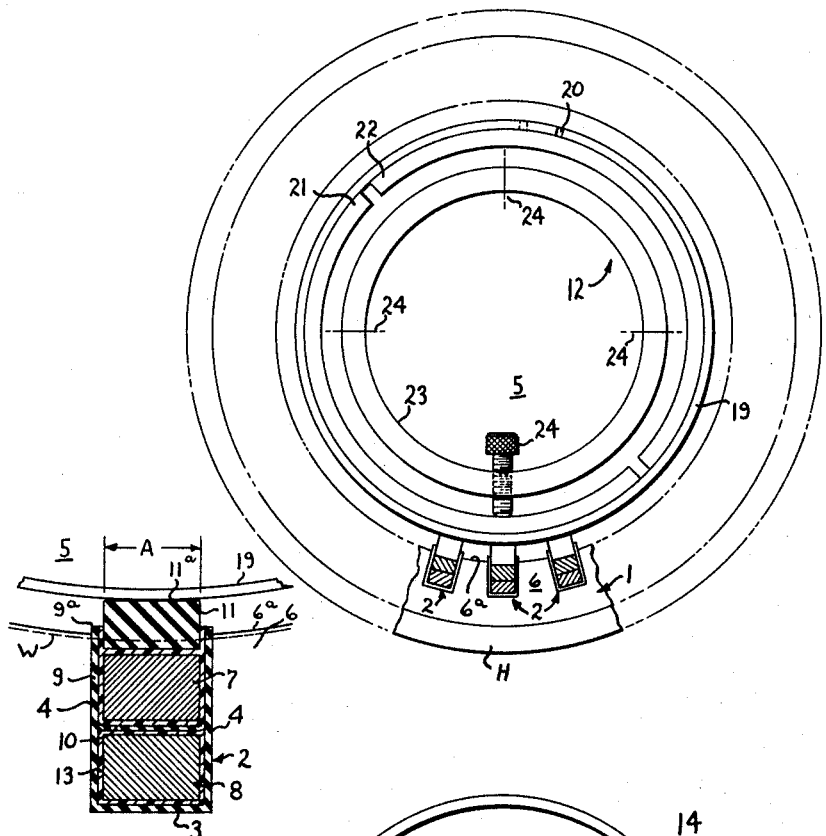
FIG.1
FIG.2
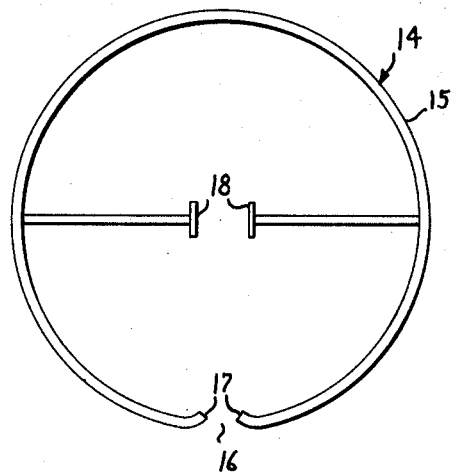
FIG.3
INVENTOR.
ROY L. BALKE
BY
Robert H Montgomery
ATTORNEY

United States Patent Office 3,157,939
Patented Nov. 24, 1964

3,157,939
METHOD OF INSULATING AND RETAINING CONDUCTORS IN SLOTS
Roy L. Balke, Erie, Pa., assignor to General Electric Company, a corporation of New York
Filed Apr. 6, 1961, Ser. No. 101,166
5 Claims. (Cl. 29—155.5)

This invention relates to stator insulation systems, and more particularly relates to the insulation of open slot stators of dynamoelectric machines.

By open slot stators, reference is made to stators defining slots having no overhanging means for retaining top sticks and conductors therein. Generally, open slots are of substantially rectangular cross-sectional configuration having straight, substantially parallel side walls, although in some open slot stators there may be a very slight taper in the slot side wall. The use of an open slot stator in a dynamoelectric machine presents several advantageous features. It facilitates assembly of coil sides in the stator slots and decreases tooth-to-tooth flux leakage as compared to over-hung or semi-closed stator slot design, and additionally where rectangular cross-section conductors are utilized, a high space factor is usually obtainable. It is well known that the electromagnetic efficiency of a stator is increased as the conductors are placed in the stator slots closer to the bore of the stator. This construction also decreases the depth of the stator slots and thereby requires a smaller diameter stator, resulting in material savings and decreased weight, which is highly desirable in some installations, such as aircraft.

A problem is presented in holding down conductor coil sides in open slot stators during manufacture thereof, including final forming of coil end turns. While the magnet wire forming the coils is generally made of a material such as copper or aluminum having little inherent resiliency, the physical form of the coil is usually such that, unless the coil sides are secured within the slots, they may force themselves out through the slot opening into the air gap and bind the rotor, resulting in considerable damage to the machine. Additionally, during operation of a completed dynamoelectric machine, vibration, and to some extent electromagnetic forces, may cause forces to be exerted on a conductor, tending to force the conductor out of a stator slot into the machine air gap.

It is conventional practice to provide a cover for the top conductor in a stator slot to retain the conductor in the slot, to prevent contamination from entering the slot and causing a failure by dielectric tracking, and additionally to provide a dielectric barrier between slot conductors and stator iron. The cover, generally referred to as a top stick or wedge, in order to serve these functions, occupies a large portion of the slot. Top sticks or wedges have heretofore been wedged into the slot with an interference fit; or grooves or slots have been provided in the top portions of the stator teeth forming the stator slot into which the top stick is secured. Wedging of the top stick into the stator slot within the slot liners may result in cutting the slot liners, ultimately leading to a ground fault. Additionally, it is necessary to tamp, hammer, or otherwise force each top stick in its respective slot or slot liner, which is time-consuming. Moreover, providing grooves or slots in the side walls of the stator teeth to retain the top stick therein decreases the electromagnetic efficiency of the stator and necessitates deepening of the slot.

It is therefore among the objects of this invention to provide a new and improved technique for insulating the conductors in open slot stators.

It is a further object of this invention to provide an improved technique for retaining and protecting conductors in open slot stators.

It is a still further object of this invention to provide a dynamoelectric machine having increased efficiency due to more efficient utilization of slot space, and further decrease the amount of stator iron for a given machine design through utilization of an improved slot insulation technique, or in the alternative, to increase the amount of conductor per slot.

Another object of the invention is the provision of an improved technique for inserting and securing top sticks in their slots.

Briefly stated, the invention in one form thereof comprises, in the manufacture of dynamoelectric machines, the steps of inserting and retaining top sticks selected to have a slip fit with the slot liners into the slot liners to close the slots, exerting a radially compressive force on the top sticks after insertion in the slots, and simultaneously securing all top sticks in the respective slot liners to support the conductors therein.

The features of the invention which are believed to be novel are set forth with particularity in the appended claims. The invention itself, together with further objects and advantages thereof, may most readily be appreciated through reference to the following description taken in conjunction with the following drawings whereby:

FIGURE 1 illustrates a dynamoelectric machine stator assembly and fixture useful in practicing the invention;

FIGURE 2 illustrates a more detailed view of a stator slot being insulated in accordance with the invention; and FIGURE 3 illustrates a fixture useful in practicing an embodiment of the invention.

Referring now to the drawings, in FIGS. 1 and 2 is shown a stator core 1 of a dynamoelectric machine having open slots 2 of rectangular cross-sectional configuration. The slots 2, which are defined by a bottom wall 3 and side walls 4, openly communicate with the stator bore 5 which is arranged to receive a rotor, not shown, therein, and further define stator teeth 6 having surfaces 6a which define the stator bore 5. The stator core 1, which is carried by a frame or housing member H, may be formed from a stack of laminated punchings of magnetic material. In FIG. 1, only three slots are illustrated in stator core 1; however, it will be understood that the slots 2 are provided around the inner periphery of the stator at predetermined spaced intervals. In the illustrations, each slot 2 (see FIG. 2) contains conductors 7 and 8, illustrated as being a rectangular cross-section, which are part of formed stator coils, not fully shown, and a slot liner 9 to provide adequate dielectric insulation between the conductors 7 and 8 and the stator iron. Between the conductors 7 and 8 in the slot liner is inserted an insulating separator 10. Placed on top of conductor 7 within slot liner 9 is top stick 11. In FIG. 1 a radially expandable fixture 12 is illustrated within the bore 5 of the stator core 1. The structure and function of fixture 12 is hereinafter described.

In assembled the above-described stator in accordance with one technique embodying the invention, the slot liners 9 are inserted in slots 2. In accordance with conventional practice, the slot liners are selected to be slightly longer than the width of the stator core 1 so that the slot liners 9 extend a small distance beyond each end of the stator core to insulate the conductors 7 and 8 from the stator core where the conductors 7 and 8 leave the slots 2. The slot liners 9 may be formed to proper size and shape prior to insertion, or may be of a pliable material such as a glass cloth-mica paper-glass cloth laminate in a semi-cured binder which accepts the shape of the slot when inserted therein. The stator coils which provide conductors 8 are then positioned in the slot liners 9 with an insulating bonding material 13, such as an epoxy or polyester resin, thereon to provide an adhesive to bond the conductors 8 to the slot liner 9. The insulating separator 10 is then placed on top of conductor 8. Conductor 7, having bonding resin 13 thereon, is then applied to the top of insulating separator 10 and top of stick 11 is then applied to the top conductor 7 and imbedded part way into the bonding material 13 such that the top stick rests on the conductor, and the bonding material fills in and around the lower portion of the top stick. The top stick 11 is selected to have a dimension A such that the top stick has a slip fit within slot liner 9 to facilitate insertion of the top stick 11 therein. Slot liners 9 may be dimensioned to have edge portions 9a extend beyond the stator bore 5 to further facilitate positioning of the top sticks therein. The top sticks are preferably further selected to have a dimension in the radius of the stator so that top stick surface 11a extends farther into the stator bore than edge portions 9a of the slot liners.

Inasmuch as the top sticks 11 are designed to have no more than a snug slip fit within the slot liners 9, provision is made to retain those top sticks which have already been inserted into slot liners therein. A fixture 14, shown in FIG. 3, comprises a flexible hoop-like portion 15 defining a discontinuity 16. The edges 17 of the hoop 15 defining the discontinuity are dished inwardly. The diameter of the fixture 14 may be decreased by urging grips 18 together to fit the fixture within bore 5. When force on the grips 18 is released, the hoop 15 expands and bears lightly on the extending edge portions 9a of slot liners 9. The top sticks 11 are then inserted through the discontinuity 16 in an exposed slot liner. The dishing of the edges 17 facilitates rotation of the fixture 14 within the bore to expose a slot liner requiring a top stick, and at the same time covers the top sticks previously inserted into the slot liners to retain the top sticks therein.

The fixture 12 (FIG. 1) comprises a resilient metallic band 19 having a diagonally directed discontinuity 20 to allow radial expansion of the band 19 and still contact surfaces 11a of top sticks 11. The fixture 12 further comprises members 21 and 22 which are sectors of an annulus which is positioned within the band 19. Positioned within the members 21 and 22 is an annular member 23 having studs 24 threadably extending therethrough into contact with the members 21 and 22. When the studs 24 are screwed into member 23, they will force members 21 and 22 outwardly which radially expands band 19, which compresses top sticks 11 by bearing on surfaces 11a of the top sticks. The force applied to the top sticks forces the conductors to properly seat beneath the bore and the top stick to settle in the bonding material. If desired, shims, not shown, may be inserted between the band 19 and surfaces 6a to limit the force applied to the surfaces 11a by the fixture 12, and additionally to control the thickness of the top stick in the slot. The bonding material is then cured to secure the conductors 7 and 8 and the conductor insulation system together, and the fixture 12 is then removed. The coil end turns may now be finally formed and insulated and the assembled stator subjected to the usual varnish impregnation treatment. The varnish impregnating treatment fills any voids in the slots 2 and bonds the slot liner within the slot and additionally treats the end turns.

The extending edge portions 9a of the slot liners 9 and the portion of the top stick 11 extending into the bore 5 are then removed during the finish machining operation on the stator bore, which provides the finished stator bore the defining wall W. This operation will also remove any resin which has adhered to the stator bore. In practicing the invention, a top stick of conventional material, such as laminated glass cloth impregnated with melamine glass or other suitable binder, is normally used. It has been found that the cross-sectional configuration of the top stick 11 is not critical, and a top stick of circular cross-sectional configuration has been used which decreases the possibility of forcing the top stick from the slot during the final machining operation on the bore. However, the circular top stick material is not as economical as one of rectangular cross-sectional configuration which may be cut from large sheets of insulating material. In some stator assemblies it may be desirable to apply a bonding material to the outside surfaces of the slot liner as the slot liner 9 is positioned within the slot 2. In one embodiment of the invention where the slot liners 9 have a bonding material placed on the slot side before insertion within the slots 2, I use a glass-mica paper-glass composite slot liner with a polyester resin binder in a semi-cured state. The bonding resin 13, as well as the top stick binder, may be a polyester resin of the type disclosed and claimed in U.S. Patent 2,528,235, assigned to the same assignee as this application. In practice, a particular polyester resin which may be used is marketed under the registered trade name "Permafil" by the General Electric Company and designated "Permafil 73517" thereby. This resin is preferred due to its high bonding strength at elevated temperatures. It is further compatible with magnet wire of the type disclosed in U.S. Patent 2,936,296, assigned to the same assignee as this application. The insulating separator 10 may be of the same material as the slot liner 9.

The particular materials used in assembling the stator windings and insulations therefor in the stator slots are not critical to the invention, and the example is given above for purposes of illustration only. The insulating materials and bonding resins may vary in accordance with design considerations of a particular machine, e.g., the operating temperature of the stator.

It may be seen that this stator structure requires only a relatively thin top stick 11 which decreases the slot depth necessary to contain conductors 7 and 8, and therefore resulting in a reduction in size of the stator core. A limitation on the thinness of a finished top stick is the dielectric stress it must withstand. It will be further seen that there is no wedging action on the top stick 11 into the slot liner 9 which might produce a cut-through of the slot liner and lead to eventual failure of the machine due to dielectric tracking.

It is not critical to the invention that the slot liner 9 and top stick 11 extend into the bore 5 inasmuch as the top stick 11 may be so dimensioned in conjunction with the dimensions of the conductors 7 and 8, and the amount of resin 13 applied to the conductors 7 and 8 such that the surface 11a of the top stick essentially coincides with the surface defining the bore 5. When the top stick is so dimensioned the expandable fixture 12 is still utilized to retain the slot conductors and insulation system therefor within the slots during the curing operation of the resin 13, which secures the conductors and insulation system together. However, it is preferred that the top sticks 11 be dimensioned to extend beyond the surface 6a defining the stator bore in that dimensioning of materials need not be exceedingly accurate, and any variance in amount of resin or in size of conductors 7 and 8 may be compensated for.

In another technique embodying the invention, wherein it may not be desirable to apply the bonding resin 13 to the conductors prior to positioning in the slot liners 9, the slot liners 9, conductors 7 and 8, and insulating separator 10 are first placed in the slots in the order heretofore explained, and then the top sticks 11 are inserted through use of the fixture 14 as previously described with a bonding resin on the slot side thereof, and fixture 12 is utilized to push the top sticks into the slots.

The bonding material applied to the slot side of the top sticks is then at least partially cured to provide sufficient solvent resistance to the subsequent varnish dip. This step is provided to firmly anchor the top stick within the slot to prevent the top stick from being knocked out during final machining of the bore. The stator is then subjected to a varnish impregnation treatment to fill the voids within the slots and bond the conductors and insulation system therefor to each other and to the slot walls 3 and 4. After the varnish is cured and bonding resin on the slot side of the top stick is completely cured, the fixture 12 is removed from the bore 5 and cleaned in a caustic solution to remove accumulated varnish.

While I have described various techniques which may embody the invention, it will be apparent that all of these techniques will yield a stator assembly having a high slot-space factor; which allows a decrease in slot depth and provides a thinner finished top stick portion, thereby allowing positioning of the stator conductors closer to the stator bore, or alternatively, increasing the amount of conductor per slot. It will be further noted that in the techniques described, a top stick having a slip fit with the slot liner is provided, and all top sticks are simultaneously secured by bonding in their respective slots. As previously touched upon, the bonding resins and/or impregnating varnishes will be selected to be compatible with the magnet wire and the sheet insulations, i.e., top stick separating insulator 10 and slot liner utilized; or in the alternative, the insulating sheet materials may be selected to be compatible with the bonding materials utilized. Various sheet insulating structures and bonding materials of epoxy and polyester resin are well known to those skilled in the art, as well as their compatibilties with each other, and will be selected for the operating conditions and environment for which a particular machine is designed and will be utilized. The invention is applicable to any dynamo-electric machine stator having open slots. Moreover, the invention may be practiced in stators having random windings as well as those utilizing formed coils. Furthermore, while I have illustrated and described a stator having two conductors per slot, the invention is applicable to stators having more or less conductors per slot.

While I have described several embodiments of the invention, changes in these disclosed embodiments may occur to those skilled in the art which do not depart from the spirit and scope of the invention. Accordingly, it is intended to cover all changes and modifications of the examples of the manner in which the invention may be practiced herein chosen for purposes of disclosure which do not constitute departure from the spirit and scope of the invention.

What I claim as new and desire to secure by Letters Patent of the United States is:

1. The method of insulating and retaining conductors in open top conductor-receiving slots of dynamoelectric machine stators which comprises: inserting electrical insulating material into each of said slots to provide an insulating slot-liner therefor whose edges extend to at least the open top of the slot; inserting electrical conductors into each of the slots so lined; providing an electrically insulating top stick dimensioned for loose insertion on top of said conductors in each of said slots; temporarily retaining inserted top sticks as successive top sticks are being inserted in the remaining slots of said stator; providing an electrically insulating bonding material for application to at least one of the elements inserted in said slots; applying a compressive force to the top surface of each of said top sticks simultaneously to seat said top sticks and said conductors a predetermined depth into said slots and into the bonding material associated therewith; and curing said bonding material to retain said elements at said predetermined depth in said slots when said compressive force is removed and prior to final resin impregnation of said stator.

2. The method of claim 1 wherein said electrically insulating bonding material is applied to the electrical conductors inserted into said slots.

3. The method of claim 1 wherein said electrically insulating bonding material is applied between the slots and the electrical insulating material providing the slot-liners therefor.

4. The method of claim 1 wherein said electrically insulating bonding material is applied between the top of said conductors and the surface of the top sticks adjacent thereto.

5. The method of insulating and retaining conductors in open top conductor-receiving slots of electrical members which comprises: inserting electrical insulating material into each of said slots to provide a slot-liner therefor whose edges extend to at least the open top of the slot; inserting electrical conductors into each of the slots so lined; providing an electrically insulating top stick dimensioned for loose insertion on top of the conductors in each of said slots; applying an electrically insulating bonding material between the top of said electrical conductors and the surface of said top stick adjacent thereto; temporarily retaining inserted top sticks as successive top sticks are being inserted into the remaining slots; applying a compressive force to the top surface of each of said top sticks simultaneously to seat said top sticks and said conductors a predetermined depth into said slots; at least partially curing the bonding material between said top stick and said conductors to bond the top stick and the conductors in each slot together; and maintaining said compressive force on the top surfaces of said top sticks while subjecting said electrical member to a resin impregnation and curing treatment.

References Cited by the Examiner
UNITED STATES PATENTS

| | | | |
|---|---|---|---|
| 1,538,187 | 5/25 | Herrick | 29—155.5 |
| 2,354,551 | 7/44 | Sawyer | 29—155.5 |
| 2,573,126 | 10/51 | Andrus. | |
| 2,648,018 | 8/53 | Meir | 29—155.53 |
| 2,701,316 | 2/55 | Willits et al. | 310—214 |
| 2,858,462 | 10/58 | Knaus | 310—214 |

JOHN F. CAMPBELL, *Primary Examiner.*

ORIS L. RADER, *Examiner.*